J. B. Reyman,
Wire Fence,
Nº 18,301. Patented Sep. 29, 1857.
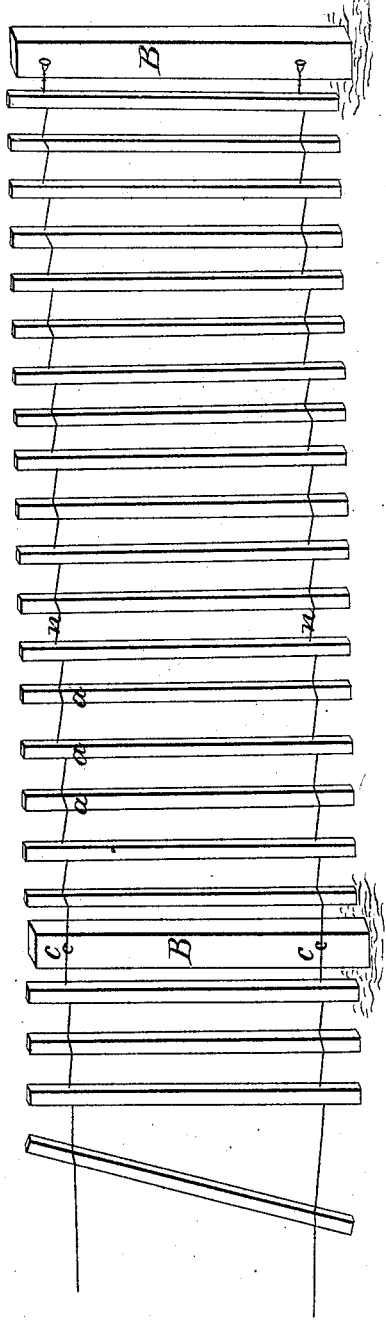
Witnesses,
P. W. Gaffron
Richard Lender
Inventor;
J. B. Reyman

UNITED STATES PATENT OFFICE.

J. B. REYMAN, OF BLOOMINGTON, ILLINOIS.

CONSTRUCTION OF WIRE FENCES.

Specification of Letters Patent No. 18,301, dated September 29, 1857.

*To all whom it may concern:*

Be it known that I, J. B. REYMAN, of Bloomington, in the county of McLean and State of Illinois, have invented an Improvement in Making Wire-and-Picket Fences; and I do hereby declare that the following is a full and exact description thereof, reference being had to the accompanying drawings and to the letters of reference marked thereon.

My invention consists in a method of fastening the pickets or paling to the wires in making wire and picket fences.

To enable others skilled in the art to construct and use my improved fence the following description is given:

The fence consists of two strands of wire $n$, $n$, extending through its entire length and supported at the ends and at intervals by common posts B, B. As the wires will be continually shortened, when the pickets are being fastened on, it is necessary to provide a means whereby they may slacken as occasion may require. This is accomplished by fastening the ends of the wires permanently to the posts at the beginning and extending them along the line of the fence and fastening the other ends temporarily to a post, by simply drawing them through holes bored for the purpose, and driving pins loosely by their sides. The posts being set and the wires thus arranged are ready for fastening on the pickets.

The pickets $a$, $a$, $a$, are of the usual form and size and have slanting notches cut across them near the ends for the reception of the wires. These notches are cut with a saw just wide enough to admit the wires and about one fourth of an inch deep. The pickets being thus prepared are ready to be fastened on the wires, which is done by placing them one at a time in the slanting position as shown by the one at $d$, slipping the wires into the notches and driving the lower or extended end toward the preceding picket until it becomes at or near right angles to the general course of the wires. The slanting notches thus kink or bend the wires at their junction with the pickets and prevent them ever afterward slipping or sliding on the wires. The wires being drawn tight also causes them to cut into the pickets and holds them firmly. To render them still more secure, small nails are driven into the pickets by the sides of the wires in the notches, the heads of the nails filling the notches and securing the wires. The pickets are best put on with the notches alternately to the right and left, as shown, but it is not absolutely necessary. As the panels are finished they are fastened to the posts by common staples $c$, $c$. The same result, that is, the kinking of the wires to hold or fasten the pickets, can be accomplished by slanting holes through the pickets instead of notches, or the notches may be cut at right angles across the pickets and the wires kinked by placing the pickets in a slanting or angular position in the fence. When the fence is up the wires should be well painted to prevent rusting.

What I claim as my invention and desire to secure by Letters Patent, is—

Bending or kinking the wires by the means, in the manner, and for the purpose substantially as described.

J. B. REYMAN.

In presence of—
  F. W. GAFFRON,
  RICHARD LENDER.